R. S. SCOTT.
PROCESS AND APPARATUS FOR CONFECTION MAKING.
APPLICATION FILED JAN. 31, 1921.
1,414,528.
Patented May 2, 1922.
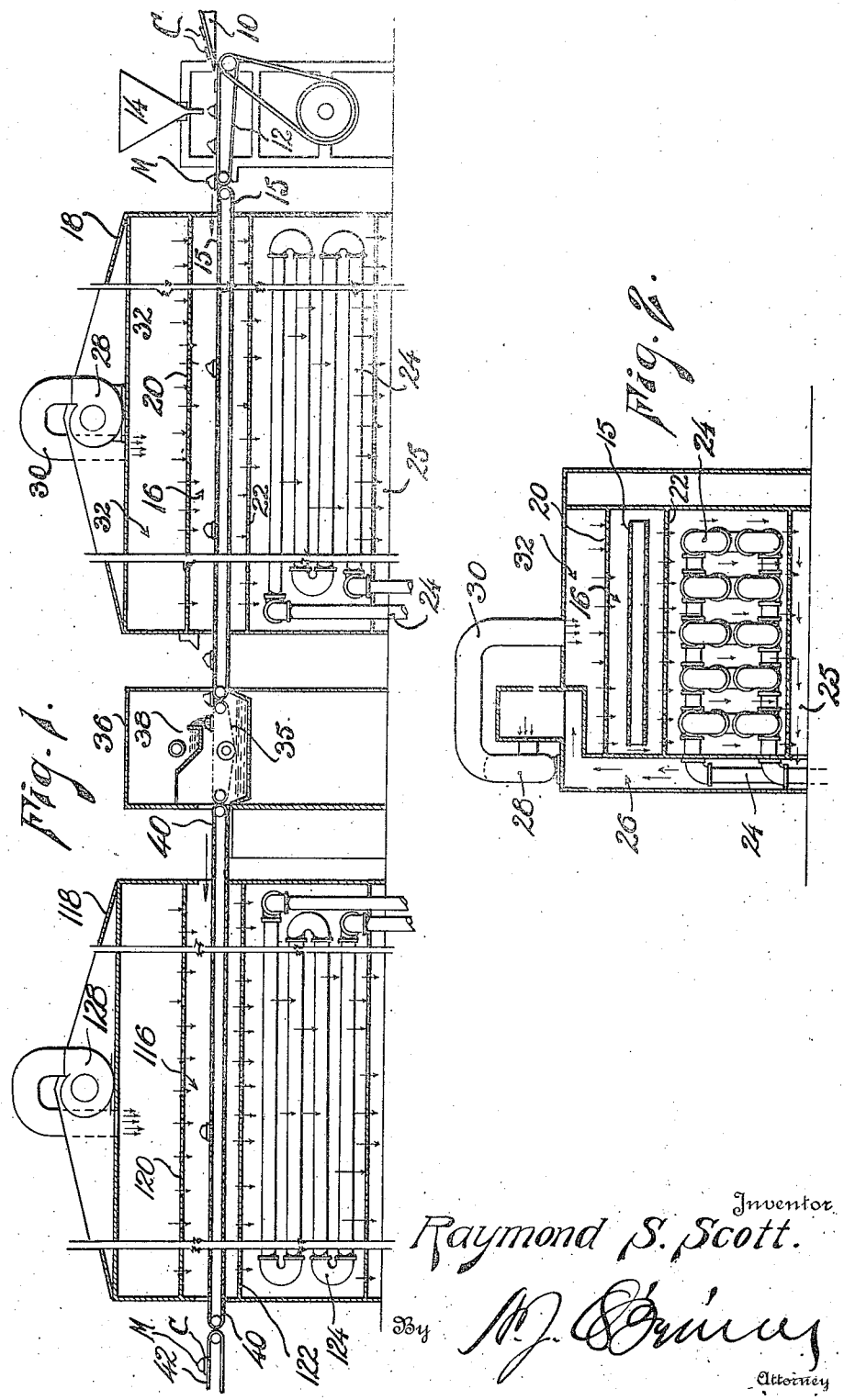
Inventor
Raymond S. Scott.
By M. J. O'Brien
Attorney

UNITED STATES PATENT OFFICE.

RAYMOND S. SCOTT, OF DENVER, COLORADO.

PROCESS AND APPARATUS FOR CONFECTION MAKING.

1,414,528. Specification of Letters Patent. Patented May 2, 1922.

Application filed January 31, 1921. Serial No. 441,178.

*To all whom it may concern:*

Be it known that I, RAYMOND S. SCOTT, a citizen of the United States, residing at the city and county of Denver and State of Colorado, have invented certain new and useful Improvements in Processes and Apparatus for Confection Making; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a process and an apparatus to be used in conjunction therewith, more particularly for making what are commonly known as bon bons, but which may also be used for other goods made up with marshmallow or other soft substance having similar characteristics.

Briefly, the process comprises treating a marshmallow deposit to cause the surface of the deposit to set or dry so as to form at said surface a sort of "skin," which presents appreciable toughness as compared with the original surface, so that the marshmallow body will retain its form either for packing directly or for passing through a chocolate coating or enrobing machine, wherein heated liquid chocolate is flowed over the marshmallow. In actual practice, the drying or setting is produced by passing a current of air at a low temperature over the marshmallow deposit for a length of time sufficient to cause the same to set. At a temperature in the neighborhod of freezing this may be accomplished in about five minutes. The set so obtained is sufficient to cause the marshmallow to retain its form as it passes through the heated chocolate of the enrobing machine. Preferably, the coated confection is chilled after leaving the enrobing machine to prepare the same for packing.

In the drawings:

Fig. 1 is a vertical longitudinal section through a machine for producing bon bons, as above indicated; and Fig. 2 is a vertical cross section through one of the refrigerating or chilling devices.

In Fig. 1 there is shown a chute 10 from which small cakes C are adapted to be fed to an endless belt 12 of a depositing apparatus wherein marshmallow deposits are placed upon the cakes C from a hopper 14, the marshmallow deposit being indicated at M. The cakes now provided with the deposit are transferred from the belt 12 to an endless conveyor 15, which carries the confections through a chilling chamber 16 in a chilling apparatus 18, the chamber 16 being separated from the rest of the chilling apparatus by an upper wall 20 and a lower wall 22, both of which are perforated for the passage of circulating chilled air, as indicated by the small arrows. The chilled air enters the chamber 16 through the upper perforated wall 20 and passes through and around the preferably porous conveyor 15 to the lower perforated wall 22, through which it passes into the refrigerating chamber below, wherein refrigerating pipes 24 are provided. Here the moisture which has been taken up by the air from the marshmallow deposits in the chamber 16 is separated and condensed upon the pipes 24. The dry air thus produced passes through a perforated bottom plate into a lower chamber, whence it moves to one side of the apparatus and is drawn upward through a passage 26 by a fan 28 and forced through a conduit 30 into the chamber 32 in the top of the apparatus 18 for return to the chilling chamber 16.

After being carried from the chilling apparatus 18 by the conveyor 15, the confections may be packed directly, if desired, or dusted with coconut, for instance, and then packed, or the conveyor 15 may discharge them directly upon wire conveyors 35 of an enrobing device 36, wherein the confections are coated or flowed with liquid chocolate, as from a trough 38. The confections are now discharged by the wire conveyors 35 on to another conveyor 40, which carries them through a second chilling apparatus 118 like the chilling apparatus 18 and having a chilling chamber 116, upper and lower walls 120 and 122, refrigerating pipes 124 and circulating fan 128 corresponding to the parts of the apparatus 18. In this apparatus the chocolate coating received in the enrobing device 36 is chilled and hardened to prepare the confections for packing after discharge from the conveyor 40 to a receiving conveyor 42, from which they may be removed by operators.

Since the chocolate coating is applied quickly in the enrobing machine 36, the speed of the wire conveyors 35 may be greater than that of the conveyor 15, and likewise since the chocolate sets or hardens more quickly than the marshmallow will set, the confections need not remain in the chilling apparatus 118 so long as they are required to remain in the first chilling device 18.

This apparatus and process enables one to cut down the time of preparing bon bons for packing from many hours to about ten minutes. Heretofore, it has been customary to allow the cakes with their marshmallow deposit to stand at least over night, and sometimes longer to permit the marshmallow to set sufficiently so that it will stand up either for packing or for passing through an enrobing machine. The whole process is completed in nine or ten minutes.

From the foregoing it will be apparent that I have invented means for handling marshmallow goods which materially reduces the period of time required for setting the marshmallow, and enables the process, even where it includes chocolate coating, to be completed within a very few minutes, as distinguished from the former process which required many hours.

I claim:

1. A process for handling biscuits having a deposit of marshmallow or like substance, which comprises rapidly drying the surface of the deposit whereby a "skin" is formed.

2. A process for handling biscuits having a deposit of soft substance such as marshmallow, which comprises quickly setting the surface of the deposit to form a "skin" thereon.

3. A process for handling biscuits having a deposit thereon of marshmallow or like substance, which comprises subjecting the deposit to a temperature adapted to set the surface of the deposit and form a "skin" thereon.

4. A process for handling biscuits having a deposit thereon of marshmallow or like substance, which comprises subjecting the deposit to a low temperature for quickly drying or setting the surface of the deposit and forming a "skin" at said surface.

5. A process of decorating biscuits which comprises making a deposit of soft substance such as marshmallow and rapidly setting the surface of the deposit to form a protecting "skin" thereon.

6. A process of decorating biscuits comprising making a deposit of soft substance such as marshmallow, and subjecting the deposit to a temperature capable of quickly setting the surface of the deposit and forming a "skin" of appreciable toughness.

7. A process for decorating and coating biscuits comprising making a deposit of soft substance such as marshmallow and subjecting the same to a low temperature capable of quickly setting the surface of the deposit whereby a "skin" is formed thereon.

8. A process of decorating and coating biscuits comprising making a deposit of a soft substance such as marshmallow, and promptly subjecting the deposit to an atmosphere capable of quickly setting the surface of the deposit whereby a "skin" is formed thereon.

9. A process of making fancy biscuits comprising making a deposit of a soft substance such as marshmallow, and immediately treating said deposit to quickly set the surface of the deposit and form a protective "skin" thereon.

10. A process of making fancy biscuits comprising making a deposit of a soft substance such as marshmallow, and immediately treating said deposit to quickly set the surface of the deposit, thereby forming a "skin" capable of receiving a coating of a heated substance without appreciable change in the form of the deposit.

11. A process of making fancy coated biscuits comprising making a deposit of a soft substance such as marshmallow, immediately treating said deposit to quickly set the surface of the deposit, thereby forming a "skin" capable of receiving a coating of a heated substance without appreciable change in the form of the deposit, and then coating said deposit with said heated substance.

12. A process of making confections comprising making a deposit of a soft substance such as marshmallow, immediately treating said deposit to quickly set the surface of the deposit, thereby forming a "skin" capable of receiving a coating of a heated substance without appreciable change in the form of the deposit, then coating said deposit with said heated substance, and then chilling the coated deposit to set the coat.

13. A process for making confections comprising making a deposit of a soft substance such as marshmallow, and chilling the surface of the deposit to quickly set the same whereby a protective "skin" is formed thereon.

14. A process for making baking products comprising making a deposit of a soft substance such as marshmallow, chilling the surface of the deposit to quickly set the same, thereby forming a "skin" capable of receiving a coating of heated substance without appreciable change in the form of the deposit, and then coating said deposit with said heated substance.

15. A process for enrobing biscuits comprising making a deposit of a soft substance such as marshmallow, chilling the surface of the deposit to quickly set the same, thereby forming a "skin" capable of receiving a coating of a heated substance without appreciable change in the form of the deposit, then coating said deposit with said heated substance, and then chilling the coated deposit to set the coat.

16. A process of enrobing biscuits comprising making a deposit of a soft substance such as marshmallow on a base cake, rapidly setting the surface of the deposit, thereby forming a "skin" capable of receiving a coating of a heated substance without appreciable change in the form of the deposit, and then coating said deposit with said heated substance.

17. A process of making fancy coated biscuits comprising making a deposit of a soft substance such as marshmallow, rapidly setting the surface of the deposit, thereby forming a "skin" capable of receiving a coating of a heated substance without appreciable change in the form of the deposit, then coating said deposit with said heated substance, then chilling the coated deposit to set the coat.

18. A process for making fancy coated biscuits comprising making a deposit of soft substance such as marshmallow and subjecting the same to a temperature capable of quickly setting the surface of the deposit, thereby forming a "skin" capable of receiving a coating of a heated substance without appreciable change in the form of the deposit, and then coating said deposit with said heated substance.

19. A process for making fancy coated biscuits comprising making a deposit of soft substance such as marshmallow and subjecting the same to a temperature capable of quickly setting the surface of the deposit, thereby forming a "skin" capable of receiving a coating of a heated substance without appreciable change in the form of the deposit, then coating said deposit with said heated substance, and then chilling the coated deposit to set the coat.

20. A process for handling biscuits having a deposit of marshmallow or like substance, which comprises rapidly drying the surface of the deposit, thereby forming a "skin" capable of receiving a coating of a heated substance without appreciable change in the form of the deposit, and then coating said deposit with said heated substance.

21. A biscuit making apparatus comprising a depositing device, a skin forming chamber, and means for conducting confections from the depositor to the skin forming chamber.

22. A fancy cake making apparatus comprising a depositor, a skin forming chamber, an enrobing device, and means for conveying confections continuously from said depositor through said skin forming chamber and through said enrobing device.

23. A fancy biscuit making apparatus comprising a depositor, a skin forming chamber, an enrobing device, means for conveying confections continuously from said depositor through said skin forming chamber and through said enrobing device, a chilling chamber, and means for conveying the confections from the enrober through the chilling chamber to set the coat received in the enrober.

In testimony whereof I affix my signature.

RAYMOND S. SCOTT.